United States Patent [19]
Last

[11] 4,289,831
[45] Sep. 15, 1981

[54] POLYOLEFIN FILMS
[75] Inventor: Anthony G. M. Last, Welwyn Garden City, England
[73] Assignee: Imperial Chemical Industries Limited, London, England
[21] Appl. No.: 62,188
[22] Filed: Jul. 30, 1979
[30] Foreign Application Priority Data
Aug. 18, 1978 [GB] United Kingdom ............... 33910/78
[51] Int. Cl.³ .................. B32B 27/08; C09U 7/02; D02G 3/00
[52] U.S. Cl. .................... 428/515; 428/343; 428/347; 428/349; 428/375; 428/516
[58] Field of Search ............. 428/515, 516, 375, 347, 428/343

[56] References Cited
U.S. PATENT DOCUMENTS 2,832,697  4/1958  Walles ........................ 428/516
2,897,170  7/1959  Graber ....................... 428/375 X
3,202,528  8/1965  James ......................... 428/347

FOREIGN PATENT DOCUMENTS 1024718  4/1966  United Kingdom .
1061366  3/1967  United Kingdom .

OTHER PUBLICATIONS

English Translation Tr 14.295 of French Patent Application No. 7243009 (Papierfabriken Landquart), 10 pp. Aug. 1976.

Primary Examiner—Thomas J. Herbert, Jr.
Attorney, Agent, or Firm—Cushman, Darby & Cushman

[57] ABSTRACT

A stiff antistatic film comprising a polyolefin substrate including a modulus improver, such as a polyterpene resin, a polymeric heat-sealable surface layer and an antistatic coating layer comprising a quaternary ammonium salt, such as choline chloride.

11 Claims, No Drawings

POLYOLEFIN FILMS

This invention relates to a polymeric film, and, in particular, to an antistatic thermoplastic polymeric film of high modulus.

Polymeric films are widely utilized in the packaging industry, and to be acceptable in this field of activity must satisfy numerous stringent criteria. In particular, for use with mechanised packaging equipment, such as that employed in overwrapping cigarette cartons, a packaging film should possess a sufficiently high modulus, or inherent stiffness, to enable continuous lengths of the film to be fed smoothly and uniformly through the equipment. Desirably, the film should also exhibit a high degree of electrical conductivity so that the free movement of film through the equipment is not impeded by the accumulation of static electricity on the film or equipment surfaces which may cause the film to adhere to parts of the equipment—with consequent disruption of the packaging operation.

Accordingly, the present invention provides a self-supporting multiple-layer film comprising
- a substrate layer of a polymer of a mono-alpha-olefin containing from 2 to 8 carbon atoms in its molecule,
- a modulus improver, as hereinafter defined, incorporated in the substrate layer,
- a polymeric heat-sealable layer adhered to at least one surface of the substrate layer, and,
- on the surface of the heat-sealable layer remote from the substrate, an antistatic medium comprising a quaternary ammonium compound of general formula

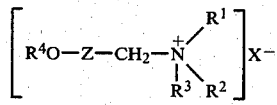

wherein each of $R^1$, $R^2$, and $R^3$, which may be the same or different, is a hydrogen atom or a lower alkyl radical containing from 1 to 6 carbon atoms, or $R^1$ and $R^2$ are each methylene groupings within a common five- or six-membered saturated heterocyclic ring, $R^4$ is a hydrogen atom or an acyl radical containing up to 15 carbon atoms, Z is a methylene group or a carbonyl group when $R^4$ is a hydrogen atom, or Z is a methylene group when $R^4$ is said acyl radical, and X is a univalent anion or an equivalent of a multivalent anion.

By a "self-supporting" film is meant a film capable of independent existence in the absence of a supporting substrate.

By an "antistatic medium" is meant a treatment medium which confers upon the film a reduced tendency to accumulate static electricity compared with an untreated film.

By a "modulus improver" is meant a resin, of natural or synthetic origin, which is amorphous, hard, brittle, and solid at ambient temperature, has a softening range at elevated temperature, has a drop softening point of at least 70° C., and is sufficiently compatible with the filmforming olefin polymer to yield a composition from which may be formed a drawn, self-supporting transparent film exhibiting a modulus exceeding that of a film formed from an identical olefin polymer in the absence of the improver resin.

Suitable modulus improvers include naturally-occurring rosin acids, such as dihydroabietic acid, and derivatives of rosin formed, for example, by disproportionation at elevated temperatures or by hydrogenation at high pressures. Other suitable, commercially available, resins, include the IMPREZ aliphatic hydrocarbon resins derived by polymerisation of a petroleum residue containing a blend of $C_4$ and $C_5$ olefins, and supplied by Imperial Chemical Industries Limited; the ESCOREZ petroleum hydrocarbon resins supplied by Esso Chemical Limited; the ZONAREZ polyterpene resins supplied by the Arizona Chemical Company; a completely saturated and aromatic vinyl toluene-alpha-methyl styrene copolymer—such as PICCOTEX; and a terpene resin derived from beta-pinene—such as PICCOLYTE, supplied by the Pennsylvania Industrial Chemical Company. Particularly useful modulus improvers are obtained by hydrogenation of a product formed by polymerising mixtures of unsaturated monomers from cracked petroleum—for example, by hydrogenation of an aliphatic PICCOPALE hydrocarbon resin supplied by the Pennsylvania Industrial Chemical Company.

Desirably, the modulus improver is relatively free from olefinic unsaturation, and preferably exhibits an iodine value of less than 50.

To prevent leaching of the modulus improver from the film structure it is preferred that the modulus improver is of relatively high molecular weight (weight average)—for example, at least 500 and preferably of the order of 1000.

Although the functional mechanism of the modulus improver is not completely understood, it is postulated that, as crystallisation of the polyolefin film occurs—for example, in the course of conventional orienting and/or heat-setting treatments, the hard, amorphous modulus improver, if homogeneously dispersed throughout the polyolefin matrix, accumulates in the residual amorphous regions of the polyolefin to form adherent inclusions between the polyolefin crystallites, thereby improving the stiffness of the film structure.

The modulus improver may be blended with the substrate-forming polyolefin by conventional mixing techniques. For example, the modulus improver may be dry mixed with the polyolefin in a simple tumble blender, or the components of the blend may be intimately mixed by melt extrusion, the components being, if desired, fed directly to the feed pocket of an extruder, and either directly extruded to form film or comminuted to particulate form suitable for subsequent re-extrusion.

The modulus improver is employed in an amount sufficient to confer the required improvement in film modulus without detriment to other desirable characteristics of the polyolefin film—such as heat-seal strength. In practice, the modulus improver suitably constitutes from 1 to 50%, preferably from 2.5 to 35%, and particularly preferably from 5 to 20%, by weight of the blend (polyolefin substrate and modulus improver).

Suitable thermoplastic polyolefins for forming a substrate layer include polymers and copolymers of 1-olefins such as ethylene, propylene, butene-1, and 4-methylpentene-1, a particularly useful material being a high molecular weight stereoregular predominantly crystalline polymer of propylene, either in the form of a homopolymer or copolymerised with minor quantities (e.g.

up to 20% by weight of the copolymer) of other unsaturated monomers, such as ethylene.

The polymeric heat-sealable layer may be formed from any homo- or co-polymer which adheres well to the substrate, and which can be melted in a temperature range below the melting temperature of the substrate polymer to yield seals of acceptable strength using standard heat-sealing equipment. Conventional heat-sealable polymers may therefore be employed. Preferably, the heat-sealable polymer is a polyolefin, e.g. an olefin homopolymer such as high density polyethylene or an olefin copolymer such as a random copolymer of ethylene with from 0.25 to 15, preferably 2 to 6, % weight of the copolymer of an alpha-mono-olefin containing from 3 to 6 carbon atoms in its molecule. Propylene and butene-1 are preferred monomers for copolymerising with ethylene. A further preferred heat-sealable polymer comprises a random copolymer of propylene (80 to 95% by weight) with another alpha-olefin containing from 4 to 10 carbon atoms, such as butene-1, as described in British Pat. No. 1,452,424, or a blend of said propylene-alpha-olefin copolymer with from 25 to 95% by weight of the blend of a polymer of an alpha-olefin containing from 4 to 10 carbon atoms in its molecule, such as butene-1, copolymerised with from 0 to 10% by weight of the copolymer of an alpha-olefin containing from 2 to 10 carbon atoms in its molecule, as described in British Pat. No. 1,495,776.

Multiple-layer films are suitably formed by combining the components of the substrate and heat-sealable layer in conventional manner, but most conveniently by a simultaneous coextrusion technique. A coextrusion technique is particularly suitable for the production of multi-layer films the opposed surface layers of which are of different composition, within the herein defined limits, or exhibit different characteristics—selected in accordance with the requirements of the application envisaged for the resultant film and/or of the packaging equipment employed. For example, the opposed surface layers may be modified to exhibit different frictional characteristics, so that the resultant differential slip film runs well on packaging machinery and seals effectively during package formation.

The lower alkyl radicals in the aforementioned formula of the quaternary ammonium compound present in the antistatic medium are preferably methyl or ethyl radicals, while the anion X, which may be any anion, including a divalent ion, such as tartrate, is suitably a nitrate or chloride ion. A preferred quaternary compound is choline chloride of formula

[HOCH$_2$CH$_2$N$^+$(CH$_3$)$_3$]Cl$^-$

Choline chloride is a particularly advantageous agent for use in packaging films in that it is colourless, non-toxic, being an essential constituent of the mammalian diet, substantially odourless, and an extremely effective antistatic agent because its small molecule yields highly mobile ions.

Choline ester salts of general formula

[RCO.OCH$_2$CH$_2$N$^+$(CH$_3$)$_3$]X$^-$ wherein R is a linear alkyl radical containing not more than 15 carbon atoms, and X is as hereinbefore defined, may also be employed. Suitable ester salts include N-(hexanoyl-oxyethyl)-trimethyl ammonium chloride.

Betaine,

[HOOCCH$_2$N$^+$(CH$_3$)$_3$]OH$^-$, is another suitable quaternary ammonium compound.

In a preferred embodiment of the invention the antistatic medium includes a glyceride of a fatty acid containing up to 22 carbon atoms in its molecule. The glyceride may be a mono-, di- or tri-glyceride or a mixture of two or more thereof. A simple glyceride containing two or more identical fatty acid residues, or a mixed glyceride containing different acid residues, may be employed. The fatty acid, preferably containing from 8 to 22 carbon atoms, from which the glyceride is derived is preferably a saturated fatty acid, such as stearic acid or behenic acid. A particularly suitable component is glyceryl monostearate containing at least 50 weight percent of the alpha form of the monoester.

In a further preferred embodiment of the invention the antistatic medium additionally comprises an organic polyol containing from 3 to 12 carbon atoms and at least two free hydroxyl groups in its molecule. The polyol is suitably an aliphatic compound, including a monosaccharide, such as glucose, and a disaccharide, such as sucrose, but is preferably of the general formula $$\begin{array}{c} CH_2OR' \\ | \\ (X-C-Y)_n \\ | \\ CH_2OR'' \end{array}$$

wherein each of R' and R", which may be the same or different, is hydrogen or an acyl radical containing from 2 to 20 carbon atoms, X is —H or —CH$_2$OR', Y is —OH or —CH$_2$OR', and n is an integer from 1 to 10, with the proviso that at least two free hydroxyl groups are present in the molecule. The polyol is preferably of relatively low molecular weight to assist migration of the polyol in or on the heat-sealable layer treated therewith, and of low volatility to assist retention of the polyol in association with that layer. Glycerol, HOCH$_2$CH(OH)CH$_2$OH, is a preferred polyol, and, being a component of the human diet, is non-toxic. Pentaerythritol and low molecular weight polyethylene glycols, for example having a molecular weight (weight average) of from 300 to 400, are also of utility.

In a still further preferred embodiment of the invention the antistatic medium includes, in addition to the hereinbefore defined quanternary ammonium compound, glyceride and organic polyol, an amine salt of general formula $$\left[ \begin{array}{c} R \diagdown \phantom{x} \diagup (CH_2CH_2O)_xH \\ \phantom{xx} N^+ \\ A \diagup \phantom{x} \diagdown (CH_2CH_2O)_yH \end{array} \right] X^-$$

wherein x is a positive integer, y is zero or a positive integer, the sum of x and y is from 2 to 5, A is a hydrogen atom and when y is zero A may also be a lower alkyl group containing from 1 to 6 carbon atoms, R is a univalent aliphatic radical containing from 8 to 22 carbon atoms, and X is a univalent anion or an equivalent of a multivalent anion.

Suitably, the amine salt is an amine sulphate, and it is preferred to use amine sulphates of the aforementioned general formula in which the sum of x and y is 2, A=H, and R is a mixture of aliphatic hydrocarbon radicals having 8 to 18, preferably 12 to 18, carbon atoms, particularly those which are derived from tallow or soya oil and are predominantly composed of hexadecyl, octadecyl and octadec-9-enyl (oleyl) radicals or derived from coconut oil and predominantly (e.g. >50 wt %) composed of dodecyl with a minor proportion (e.g. up to 20 wt %) of tetradecyl radicals. Examples of suitable amines from which amine sulphates may be prepared are sold as 'Ethomeen' T/12, 'Ethomeen' S/12, and 'Ethomeen' C/12 (Armour Hess Division of Akzo Chemie UK Limited).

The proportions of the quaternary ammonium compound, and, optionally, of the glyceride, organic polyol and amine salt, in the antistatic medium may vary within a wide range, and desirably should be selected by simple experimentation to provide a medium which when applied to the film confers thereon a surface resistivity (measured at 50% Relative Humidity and a temperature of 25° C.) not exceeding 10, and preferably less than 5.0, gigohms per square.

Desirably each of the components of the medium is present in an amount which will provide at least a monomolecular layer at the film surface. Conveniently, therefore, the medium at the film surface comprises, based on the total weight of the film (substrate plus heat-sealable layer(s)), from 0.001 to 0.5 wt % of the quaternary ammonium compound, from 0 to 0.75 wt % of the glyceride, from 0 to 0.75 wt % of the organic polyol, and from 0 to 0.05 wt % of the amine salt. A preferred composition range at the film surface comprises from 0.005 to 0.25 wt % of the quaternary ammonium compound, from 0.005 to 0.5 wt % of the glyceride, from 0.001 to 0.5 wt % of the organic polyol, and from 0.0001 to 0.025 wt % of the amine salt.

The antistatic medium may be associated with the film surface by conventional blending techniques—for example, by tumble blending the component(s) of the antistatic medium which are thermally stable at the extrusion temperature with the polymeric film-forming material, and subsequently extruding and fabricating the blend by known film-forming techniques, thereby enabling the antistatic medium to migrate through the interior of the film and on to a surface thereof. Alternatively, and preferably, the antistatic medium may be deposited directly on to the external surface of the heat-sealable layer remote from the substrate layer, conveniently as a solution or dispersion in a suitable vehicle—preferably, for economy and ease of application, in an aqueous vehicle. In a preferred embodiment of the invention a combination of preblending and wash-coating is employed in which, for example, the relatively insoluble glyceride is incorporated into the polymeric film-forming blend and allowed to migrate to the surface of the resultant film, while the quaternary ammonium salt and, optionally, the organic polyol and the amine salt, are subsequently applied to the external film surface in a suitable liquid vehicle.

The concentration of the antistatic medium in the liquid coating vehicle depends, inter alia, on the level of antistatic properties required in the treated film, and relatively high concentrations may be employed, provided that the viscosity of the solution or dispersion is not increased to a level which adversely affects the mobility and spreadability thereof. In practice, the antistatic medium is conveniently employed at a concentration of from 1 to 50 wt %, preferably from 2.5 to 35 wt %, and particularly preferably from 5 to 15 wt %, based on the weight of the solution or dispersion. It will be appreciated that because of partitioning between the substrate and heat-sealable layers the concentration of any antistatic component(s) preblended into the film-forming polymer must be increased to a level which, after migration through the film structure, will provide an adequate concentration of that component in the electrically conductive ionic layer at the film surface. For example, the glyceride, if preblended, desirably constitutes from 0.1 to 2, and preferably from 0.4 to 1.0, percent by weight of the film-forming polymer.

Multiple-layer films according to the invention may be unoriented or uniaxially oriented, but are preferably biaxially oriented by drawing in two mutually perpendicular directions in the plane of the film to impart strength thereto. Orientation of flat film may be effected by a stenter technique, while oriented tubular film is suitably produced by coextruding the polymeric materials in the form of a multi-layer tube from an annular die, cooling the extruded tube (the cast tube), reheating and inflating the tube by the so-called "bubble" process to introduce transverse orientation, and simultaneously elongating the tube longitudinally to orient the film in a lengthwise direction. The film is then preferably "heatset", i.e. dimensional stability of the film is improved by heating the film, while restrained against thermal shrinkage, to a temperature above the glass transition temperature of the polymer from which the film is formed but below the melting point thereof.

As hereinbefore described, the antistatic medium may be blended with the polymeric material prior to formation of a film therefrom, or by a combination of preblending and subsequent wash-coating. However, the relatively soluble components of the antistatic medium, such as the quaternary ammonium compound and, optionally, the organic polyol, are required in only relatively small amounts and are preferably applied directly to the external surface of the heat-sealable layer as a solution or dispersion. While the solution or dispersion may be applied between the orienting steps of a sequential drawing procedure, we prefer to apply the solution or dispersion to the cast, unoriented extrudate immediately prior to the reheating and orienting stage of the film-forming process. Evaporation of the volatile vehicle (water) is therefore effected during the reheating operation, and the antistatic medium becomes firmly bound to the film surface during orientation.

The films of the invention may conveniently contain any of the agents conventionally employed in the manufacture of thermoplastic polymeric films. Thus, agents such as dyes, pigments, lubricants, anti-oxidants, anti-blocking agents, surface-active agents, slip aids, gloss-improvers, prodegradants, and ultra-violet light stabilisers may be employed. In particular, the development of film surface conductivity may be assisted by the presence in the substrate of low molecular weight non-electrolytes added to promote properties other than conductivity, typical non-electrolytic additives being an anti-blocking aid, such as oleamide, and a surfactant, such as a long chain amine of the kind defined in the aforementioned general formula of the optional amine salt component of the antistatic medium. These additional additives are conveniently present in respective concentrations of from 0.01 to 1% (preferably about 0.2%) and from 0.01 to 1% (preferably about 0.15%) by weight of the substrate, and may be incorporated into the polymeric melt from which the substrate is formed, in which case the migrate to the film surface where they induce electrical continuity in the electrolyte layer, or they may be applied directly to the exposed surface of the heat-sealable layer. Application of these additional additives directly to the exposed surface is less desirable in that they are not readily soluble in the preferred vehicle (water), and it is difficult to apply them in amounts which are not excessive in relation to the amount of the antistatic medium.

The films may vary in thickness depending on the intended application, but usually we find that films having a thickness of from 2 to 150 microns are of general utility. Films intended for use in packaging operations are suitably within a thickness range from 10 to 50 microns. The thickness of the heat-sealable layer is desirably within a range of from 0.05 to 2.5 microns.

The films may be subjected to conventional after-treatments—for example, a corona discharge treatment to improve the bonding and print-receptive properties of the film surface.

The invention is illustrated by reference to the following Examples.

EXAMPLES 1 TO 6

Examples 1 to 2 are comparative and not according to the invention.

From an annular coextrusion die was extruded a composite triple-layer tube, having a propylene homopolymer core with a heat-sealable layer of a 60:40 by weight blend of a propylene-butene-1 copolymer (14 wt % butene-1) and a butene-1 homopolymer on each surface thereof. The core contained 0.6 percent by weight of glyceryl monostearate. The extrudate was cooled and, externally coated with an aqueous solution comprising 3.2 wt % choline chloride, 4.2 wt % glycerol, 0.19 wt % 'Ethomeen' T/12 sulphate (prepared by reacting an aqueous solution of 'Ethomeen' T/12 with concentrated sulphuric acid), and 92.41 wt % pure water. The coated tube was heated and inflated to form a bubble, which was then collapsed to yield a biaxially oriented tubular film exhibiting a draw ratio of about 7:1 in each of the longitudinal and transverse directions, and having a thickness of about 20 μm. The thickness of the heat-sealable blend layer on each surface of the film was about 0.3 micron. The tubular film was then slit to form a flat film which was heat-set, at a temperature of about 120° C., on a system of matt-surfaced, hot rollers of the kind described in British Pat. No. 1,124,886.

The aforementioned procedure was then repeated save that the thickness of the blend layer was increased to about 0.5 μm.

A similar procedure was employed to produce a series of films containing, varying amounts of 'Picco' 1055, a natural polyterpene, in the core layer.

The resultant films were assessed for stiffness (1% secant modulus) in accordance with the standard method of ASTM D882-75b, for clarity (narrow angle haze), for heat seal strength on seals formed on a Sentinel Heat Sealer, Model No. 12 AS, operating at a jaw pressure of 15 psi (0.1 MNm$^{-2}$), jaw closure time of 2 seconds, and jaw temperature of 120° C., and for electrical surface conductivity by means of a simple apparatus comprising a DC power supply of 70 volts in series with an electronic microammeter and with an electrode assembly comprising a pair of knife-edged electrodes which, when placed on the film at the desired position, thereby completed an electrical circuit through the apparatus and enabled the surface conductivity (in units of $10^{-12}$ mhos per square at 50% Relative Humidity and 25° C.) to be recorded by the microammeter.

Results are recorded in the following Table.

TABLE

| Ex. | Polyterpene in core (wt %) | Heat-seal Layer Thickness (μm) | 1% Secant Modulus (kg/m$^2$) | Narrow Angle Haze (%) | Seal Strength (g/25 mm) | Conductivity ($10^{-12}$ mhos/sq) |
|---|---|---|---|---|---|---|
| 1 | 0 | 0.3 | 245 | 23 | 370 | — |
| 2 | 0 | 0.5 | 245 | 25 | 420 | 236 |
| 3 | 5 | 0.3 | 310 | 15 | 330 | — |
| 4 | 5 | 0.5 | 310 | 18 | 420 | 227 |
| 5 | 15 | 0.3 | 330 | 11 | 415 | — |
| 6 | 15 | 0.5 | 330 | 14 | 500 | 233 |

These results demonstrate a surprising improvement in film clarity (reduction in haze) with an improvement in film stiffness as the polyterpene content in the core is increased. Heat-seal strength likewise shows a tendency to increase, while electrical surface conductivity is not significantly reduced by the inclusion of polyterpenes.

EXAMPLES 7 TO 9

Example 7 is a comparative and not according to the invention.

A procedure similar to that of Example 1 was repeated to yield an identical antistatic-coated multi-layer film save that the amount of glyceryl monostearate was increased to a nominal 0.8 weight % of the propylene homopolymer substrate, and that the thickness of the propylene-butene copolymer/butene homopolymer heat-sealable layer was increased to about 0.7 micron. This procedure was then repeated to yield two films each containing 15 weight % of 'Zonarez' 7115, a polymerised dipentene resin, in the core layer, one of these films being coated with an antistatic medium identical to that of Example 1, and the other being coated with such a medium from which the glycerol was omitted.

Results are recorded in the following Table.

TABLE

| Ex. | Polyterpene in core (wt %) | Glycerol in a/s medium (wt %) | 1% Secant Modulus (kg/m$^2$) | Narrow Angle Haze (%) | Seal Strength (g/25 mm) | Conductivity ($10^{-12}$ mhos/sq) |
|---|---|---|---|---|---|---|
| 7 | 0 | 4.2 | 211 | 20 | 302 | 923 |
| 8 | 15 | 4.2 | 217 | 19 | 477 | 506 |
| 9 | 15 | 0 | 217 | 18 | 418 | 632 |

These results show that inclusion of the polyterpene in the core yields an improvement in stiffness, in clarity and in seal strength, although the surface conductivity is somewhat depressed. Omission of the glycerol from the antistatic medium yields an improvement in clarity and surface conductivity at the expense of seal strength. In general, inclusion of an organic polyol, such as glycerol, in the antistatic medium enabled acceptable surface conductivity values to be achieved under conditions of low Relative Humidity and reduced the incidence of surface blemishes of the films.

The generally higher level of surface conductivity compared to that observed in Examples 1 to 6 is attributed to the increased content of the glyceride added to the core layer.

EXAMPLE 10

The procedure of Example 9 was repeated (no glycerol in the antistatic medium) save that the heat-sealable layer of 0.7 micron thickness was formed from a random propylene-ethylene copolymer containing about 6 weight % of ethylene, and that heat-setting was effected at an increased temperature (150° C.).

The resultant film exhibited good stiffness (220 kg/m$^2$), seal strength (410 g/25 mm) and surface conductivity (822 units) and was extremely clear (narrow angle haze 13%).

EXAMPLE 11

The procedure of Example 8 was repeated (glycerol present) save that the heat-sealable layer of 0.7 micron thickness was formed from a random ethylene-butene-1 copolymer containing about 4 weight % of butene-1, and having a density at 23° C. of 0.933 g/cc and a Melt Flow Index (190° C./2 kg) of 3.0 g/10 minutes.

The resultant film exhibited good stiffness (220 kg/m$^2$), seal strength (352 g/25 mm) and surface conductivity (443 units) and was of extreme clarity (narrow angle haze 11%).

EXAMPLES 12 AND 13

Example 12 is comparative and not according to the invention.

The procedure of Example 1 was repeated save that the film substrate was formed from a propylene-ethylene block copolymer containing about 6 weight % of ethylene. The resultant film exhibited good clarity and a surface conductivity of 171 units (Example 12). A similar procedure was employed to yield a film containing 15 weight % of 'Picco' 1055 in the copolymer core. The resultant film was of slightly inferior clarity to that of Example 12, but exhibited superior stiffness and a greatly increase surface conductivity of 423 units (Example 13).

I claim:

1. A self-supporting multiple-layer film comprising:
    a substrate layer of a polymer of a mono-alpha-olefin containing from 2 to 8 carbon atoms in its molecule, a modulus improver incorporated in the substrate layer,
    wherein said modulus improver is a resin, of natural or synthetic origin, which is (I) amorphous, hard, brittle, and solid at ambient temperature, (II) has a softening range at elevated temperature, (III) has a drop softening point of at least 70° C., and (IV) is sufficiently compatible with the film-forming olefin polymer to yield a composition from which may be formed a drawn, self-supporting transparent film exhibiting a modulus exceeding that of a film formed from an identical olefin polymer in the absence of the improver resin,
    a polymeric heat-sealable layer adhered to at least one surface of the substrate layer, and, on the surface of the heat-sealable layer remote from the substrate, an antistatic medium comprising a quaternary ammonium of general formula

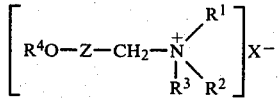

wherein each of R$^1$, R$^2$, and R$^3$, which may be the same or different, is a hydrogen atom or a lower alkyl radical containing from 1 to 6 carbon atoms, or R$^1$ and R$^2$ are each methylene groupings within a common five- or six-membered saturated heterocyclic ring, R$^4$ is a hydrogen atom or an acyl radical containing up to 15 carbon atoms, Z is a methylene group or a carbonyl group when R$^4$ is a hydrogen atom, or Z is a methylene group when R$^4$ is said acyl radical, and X is a univalent anion or an equivalent of a multivalent anion.

2. A film according to claim 1 wherein said modulus improver (I) is relatively free of olefinic unsaturation, (II) exhibits an iodine value of less than 50, and (III) has a weight average molecular weight of at least 500.

3. A film according to claim 1 wherein the modulus improver is selected from the group consisting of a rosin acid, a petroleum hydrocarbon resin, a hydrogenated petroleum resin, and a natural or synthetic polyterpene resin.

4. A film according to claim 1 wherein the substrate comprises a biaxially oriented propylene polymer.

5. A film according to claim 1 wherein the quaternary ammonium compound is choline chloride.

6. A film according to claim 1 wherein the antistatic medium additionally comprises an amine salt of general formula

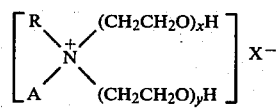

wherein x is a positive interger, y is a positive interger, the sum of x and y is from 2 to 5, A is a hydrogen atom, R is a univalent aliphatic radical containing from 8 to 22 carbon atoms or a mixture of such univalent aliphatic radicals, and X is a univalent anion or an equivalent of a multivalent anion.

7. A film according to claim 6 wherein the amine salt is an amine sulphate of the specified formula in which the sum of x and y is 2, A is a hydrogen atom, and R is a mixture of aliphatic hydrocarbon radicals containing from 12 to 18 carbon atoms.

8. A film according to claim 1 wherein the antistatic medium additionally comprises a glyceride of a fatty acid the molecule of which contains up to 22 carbon atoms.

9. A film according to claim 8 wherein the glyceride is glyceryl monostearate.

10. A film according to claim 1 wherein the antistatic medium additionally comprises an organic polyol the molecule of which contains from 3 to 12 carbon atoms and at least 2 free hydroxyl groups.

11. A film according to claim 10 wherein the organic polyol is glycerol.

* * * * *